United States Patent [19]

Christensen

[11] Patent Number: 5,454,612
[45] Date of Patent: Oct. 3, 1995

[54] PICK-UP TRUCK RAIL WITH ANCHOR SLOTS

[76] Inventor: David Christensen, 11 Moores Mill Rd., Pennington, N.J. 08534

[21] Appl. No.: 195,448

[22] Filed: Feb. 14, 1994

Related U.S. Application Data

[63] Continuation-in-part of Ser. No. 64,228, May 7, 1993, Pat. No. 5,393,114, and Ser. No. 110,388, Aug. 23, 1993, each , is a continuation-in-part of Ser. No. 908,979, Jul. 6, 1992, Pat. No. 5,238,280, which is a continuation-in-part of Ser. No. 762,575, Sep. 19, 1991, Pat. No. 5,137,320.

[51] Int. Cl.$^6$ .............................. B60P 3/00; B62D 27/06
[52] U.S. Cl. .................................. 296/3; 296/36
[58] Field of Search ................. 296/3, 39.2, 98, 296/100, 36

[56] References Cited

U.S. PATENT DOCUMENTS

| | | | |
|---|---|---|---|
| 1,718,183 | 6/1929 | Smith | 296/100 X |
| 2,134,823 | 1/1938 | Herrman et al. | |
| 3,326,597 | 6/1967 | Barker | 296/100 |
| 3,877,624 | 4/1975 | Carson | |
| 4,390,117 | 6/1983 | Fagan | |
| 4,406,493 | 9/1983 | Albrecht et al. | 296/100 |
| 4,444,427 | 4/1984 | Martin | |
| 4,575,146 | 3/1986 | Markos | 296/39.2 |
| 4,693,507 | 9/1987 | Dresen et al. | 296/39.2 |
| 4,984,837 | 1/1991 | Dise | |
| 5,002,324 | 3/1991 | Griffin | |
| 5,052,739 | 10/1991 | Irwin | 296/100 X |
| 5,137,320 | 8/1992 | Christensen | 296/3 |
| 5,228,736 | 7/1993 | Dutton | 296/100 X |
| 5,238,280 | 8/1993 | Christensen | 296/3 |
| 5,251,950 | 10/1993 | Bernardo | 296/100 X |

*Primary Examiner*—Dean Kramer
*Attorney, Agent, or Firm*—Kenneth P. Glynn; Diane L. Ferrone

[57] ABSTRACT

The present invention is a utility rail which may be used independently or as a mounting rail for a utility rack for pick-up truck cargo beds and the like with the rail. The rack is mounted with two present invention rails to cargo bed walls. Each rail has an elongated member having a generally L-shaped cross-section with a vertical segment and a horizontal segment, each segment having inside walls and outside walls; at least one elongated holding slot such as a cargo anchor T-slot running along at least a portion of the outside wall of either or both the vertical segment and the horizontal segment and locating grooves or starter holes located on either the horizontal segment or the vertical segment for penetrating said elongated member with a plurality of attachment devices for attaching said rail to a structure. The elongated member may also contain one or more hollows designed to add strength to the structure and conserve materials. The rails of the present invention are preferably unistructurally formed elongated members of extruded metal or plastic or combinations of metallic and non metallic materials.

12 Claims, 5 Drawing Sheets

PICK-UP TRUCK RAIL WITH ANCHOR SLOTS

REFERENCE TO RELATED CASES

This application is a continuation-in-part of U.S. patent application Ser. No. 08/064,228 filed May 7, 1993, entitled "Reversible Utility Rail" now U.S. Pat. No. 5,393,114 and U.S. patent application Ser. No. 08/110,388 filed Aug. 23, 1993 and entitled "Ladder Utility Rack and Inner Support Beam" both of which are a continuations-in-part of U.S. patent application Ser. No. 07/908,979, filed on Jul. 6, 1992, entitled "Utility Rack With Enhanced Rails", now U.S. Pat. No. 5,238,280, which itself is a continuation-in-part of U.S. patent application Ser. No. 07/762,575, filed on Sep. 19, 1991, entitled "Ladder Utility Rack and Mounting Rail", now U.S. Pat. No. 5,137,320, all by the same inventor herein.

BACKGROUND OF THE INVENTION

1. Field of the Invention

This invention is related to utility rails for pick-up truck cargo beds and the like, and particularly such utility rails which support tool boxes, racks for carrying ladders and other items of substantial length, and other attachable items which exceed the length of a cargo bed. The invention also relates to such utility rails as they include enhanced utility racks.

2. Prior Art Statement

With the development of cargo bed trucks came racks to support items for transport— frames for carrying lumber, glass, ladders, etc. They were initially made of wood and took on a box-like open frame configuration. Subsequently, metal racks were developed to increase both strength and longevity. While the development of ladder utility racks and other racks did not stand still, most improvements pertained to "enhancing" the basic open box-like framing by adding to it rather than changing the framing configuration itself. With the development or enhanced utility racks came the need to use creative mounting techniques, and novel mounting rails evolved in the present invention. Related prior art is as follows:

U.S. Pat. No. 2,134,823 describes a 1938 ladder rack which is side mounted and includes a complex clamping lever. U.S. Pat. No. 3,877,624 describes a ladder rack involving a plurality of bows which transverse the top of a closed truck, wherein one of the bows has clamps to clamp ladders. The bows are independently attached to the vehicle and are not connected in any fashion. Further, they appear not to be adaptable to cargo beds for carrying items having lengths greater than the cargo bed.

U.S. Pat. No. 4,390,117 describes a ladder rack for vehicles involving parallel side members and transverse cross members. It is adapted for mounting on the roof of a vehicle and, again, would not be effective for a pick-up bed. Also, complex rack attachment and ladder attachment mechanisms are included.

U.S. Pat. No. 4,444,427 teaches an auxiliary structured element for pick-up cargo beds which includes a four sided frame and subsequent cross members for mounting a deck, e.g., a top with an access door.

U.S. Pat. No. 4,984,837 is directed to a load support assembly for pick-up trucks. This device has vertical mounting supports and a tiltable load support cross member. It is used for transporting items in the cargo bed tilted upwardly and forwardly; it is cab mounted and cannot carry lengthy items in a horizontal position.

Most recently issued U.S. Pat. No. 5,002,324 describes a utility rack for pick-up cargo beds. The rack has two inverted "U" type stanchions attached to a continuous rail that encompasses both sidewalls and the forward wall of the cargo bed, itself forming a "U" type configuration in the horizontal plane. The rear stanchion is movable and removable. This is different from the present invention in the shortcoming of not teaching the present invention reversible utility rail and also differs in the extra weight and material required for the forward wall section of the continuous rail, whereas the present invention relies upon parallel rails not connected directly to one another. It is also more difficult to install since this prior art device has exact fixed width of separation of the rail due to the direct connection. It is also subject to loosening and wearing of the rear stanchion mounting parts and even subject to the possibility of accidental disassemblage of the rear stanchion. Finally, because of the need for close tolerances of the rear stanchion and its mounts, the precise separation of the rail at its rear portion is essential to enable a user to subsequently mount the rear stanchion. None of those shortcomings exist with the present invention device.

SUMMARY OF THE INVENTION

The present invention is a utility or mounting rail which may be used independently or as a mounting rail for a utility rack for pick-up truck cargo beds with the rail. The rack is mounted with two present invention rails to cargo bed walls. Each rail has an elongated member having a generally L-shaped cross-section with a vertical segment and a horizontal segment, each segment having inside walls and outside walls; at least one elongated holding slot such as a cargo anchor T-slot running along at least a portion of the outside wall of either or both the vertical segment and the horizontal segment and locating grooves or starter holes located on either the horizontal segment or the vertical segment for penetrating said elongated member with a plurality of attachment devices for attaching said rail to a structure. The elongated member may also contain one or more hollows designed to add strength to the structure and conserve materials. The rails of the present invention are preferably unistructurally formed elongated members of extruded metal or plastic. Typically, two of these rails are mounted to a bed and are not connected to one another. They provide cargo anchoring capability, they protect the sheet metal of the truck and add strength to the top of the sidewall. They also may have a tread pattern for firm footing. The utility rack, which may be bolted to the rails has stanchion units which have vertical legs running from each of the rails upwardly and inwardly and terminate at a commonly connected horizontal cross member. A preferred embodiment includes a rack with stanchions having T-bolts on the bottoms for insertion and tightening within T-slots on the utility rails of the present invention.

BRIEF DESCRIPTION OF THE DRAWINGS

The present invention should be more fully understood when the specification herein is taken in conjunction with the drawings appended hereto, wherein.

DETAILED DESCRIPTION OF THE INVENTION

The utility base rail of the present invention is elongated and has two segments in L-shaped relationship with one vertical segment and one horizontal segment. The horizontal segment rests against the top of the side wall of a pick-up truck and the vertical segment is nested on the inside of the cargo bed wall.

The present invention utility base rails may be used independently, their objective being to protect the sheet metal of the cargo bed of a pick up truck and add strength to the top of the sidewall. They have a tread pattern for firm footing, they contain a drill point guide for location of a drill bit in order to attach the utility base rail to the cargo bed.

It is a further objective to provide one or more holding slots in either or both of the segments so that the rail can be used as a multipurpose utility rail, e.g. with rack stanchions and/or tool boxes mounted on horizontal surfaces and clamps, tie downs, supports, etc., mounted on vertical surfaces.

It is another objective to provide the present invention rail with holding slots of substantial length, e.g., the entire rail length, to afford the user an infinite number of locations of mounted devices or items along the holding slot length.

The utility rack of the present invention has as one of its objectives to provide a rack which is durable and yet less complex than conventional racks. It is also an objective to provide a utility rack which has an inwardly biased horizontal cross section for receiving ladders and the like away from the outer periphery of the vehicle. It is also an objective to provide an easily installable rack which may be adapted for acting as a platform for mounting other items for transport, such as tools, tool boxes, storage bins, generators, pumps, gas motors, etc.

Figure 1:
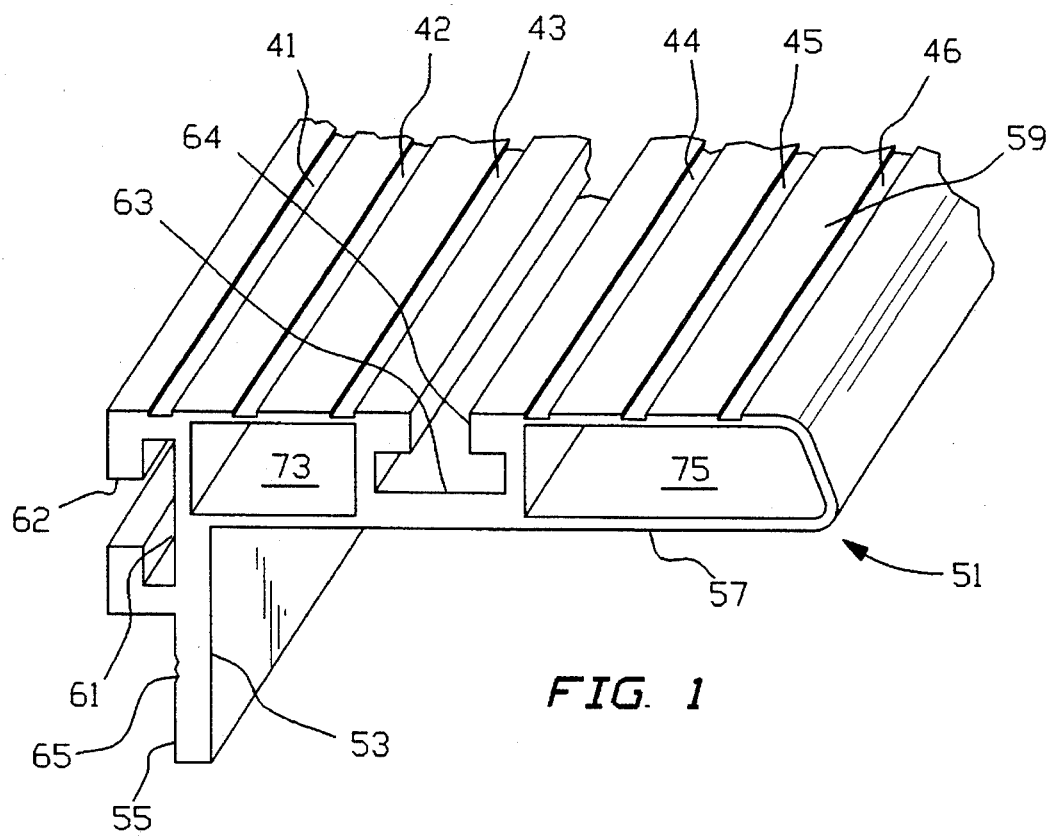
FIG. 1 shows a top perspective partial view of a first embodiment of the present invention utility rail with two T-slots and two hollows.

Referring to FIG. 1, there is shown a top perspective partial view of a present invention utility rail comprising elongated member 51 with vertical inside wall 53 and vertical outside wall 55, as shown. There is also a horizontal inside wall 57 and a horizontal outside wall 59 which converge with walls 53 and 55, respectively to form an L-shaped elongated member 51. Anti skid grooves 41, 42, 43, 44, 45 and 46 are formed in horizontal outside wall 59. A vertical holding slot 61 is shown which is cut into vertical outside wall 55. This vertical holding slot 61 is in the form of a T-slot with opening 62 facing away from the horizontal segment formed by horizontal outer wall 59 and horizontal inner wall 57. The holding slot could also be a trapezoidal slot, an oval slot with a square top or any other cut-out which would be narrower or constricted toward the vertical outside wall 55 so that some male counterpart cross sectional securing member could be slid along the holding slot so as to secure another member to the utility rail 51 of FIG. 1. In this embodiment, holding slot (T-slot) 61 is integrally formed as part of the vertical segment formed by vertical inside wall 53 and vertical outside wall 55.

Figure 2:
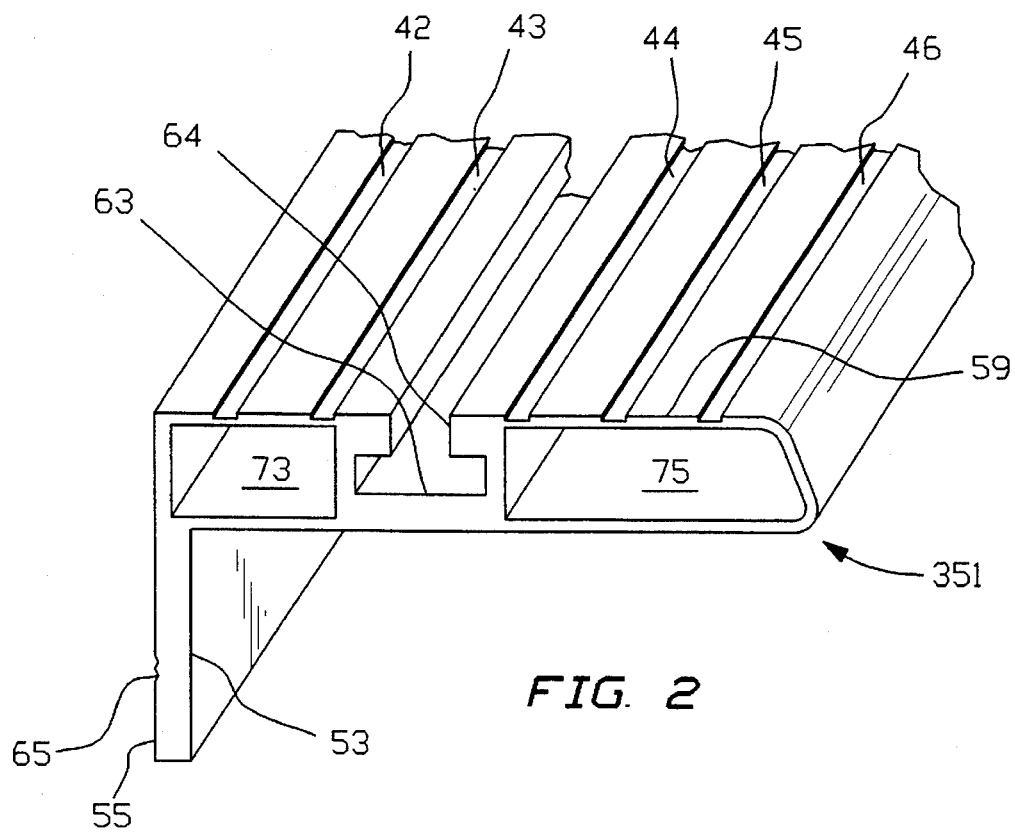
FIG. 2 shows a top perspective partial view of a second embodiment of the present invention utility rail with one horizontal T-slot and two hollows.

Penetration means 65, which is a continuous locating groove, is cut into the surface of vertical outside wall 55 enabling a user to more easily insert a screw or place a drill bit for drilling through elongated member 51 along penetration means 65 for attachment thereof to the wall of a cargo bed of a pick-up truck or other structure. Within the structure between horizontal inside wall 57 and horizontal outside wall 59 is a first hollow area 73 and a second hollow area 75. Between hollow areas 73 and 75 is shown horizontal holding slot (T-slot) 63 with upwardly facing opening 64. Like the vertical holding slot 61, horizontal holding slot 63 could also be a trapezoidal slot, an oval slot with a square top or any other cut-out which would be narrower or constricted toward the horizontal outside wall 55 so that some male counterpart cross sectional securing member could be slid along the holding slot so as to secure another member to the utility rail 51 of FIG. 1. The hollow areas are formed via continuous extrusion and are shaped as shown. The hollow areas which do not form a function of creating holding slots or penetrating means for fastening both conserve materials and create geometries which enhance the structural stability of the present invention utility rails. FIG. 2 shows a top perspective partial view of present invention utility rail 351 wherein like parts are like numbered to those in FIG. 1. Unlike the embodiment of FIG. 1 which has two T-slots, this embodiment has only one T-slot which is horizontal T-slot 63 with upwardly facing opening 64 located in horizontal segment formed by inner horizontal wall 57 and outer horizontal wall 59. Horizontal T-slot 63 is not directly over the vertical formed by inner vertical wall 53 and outer vertical wall 55.

Figure 3:
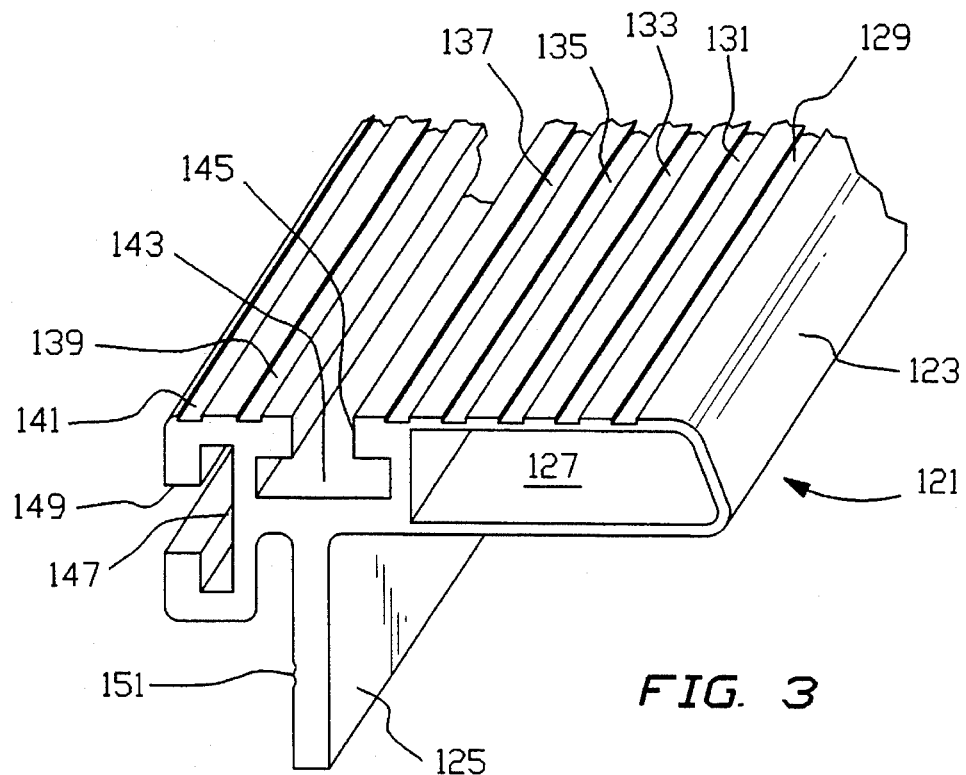
FIG. 3 shows a top perspective partial view of a third embodiment of the present invention utility rail with two T-slots and one hollow.

FIG. 3 shows a top perspective partial view of present invention utility rail 121 having vertical segment 125 and horizontal segment 123 which are 90 degrees opposed to one another. From the previous detailed discussion of FIGS. 1 and 2, it should be understood that the vertical and horizontal segments are formed by an inner wall and an outer wall and hereinafter the term "segment" will be used to refer to the vertical and horizontal portions of the present invention rail formed by the inner and outer horizontal and vertical walls discussed in the previous FIGS. 1 and 2. Vertically arranged T-slot 147 with opening 149 facing away from horizontal segment 123 extends downwardly from horizontal segment 123 and does not connect with or is it formed as part of vertical segment 125 (unlike holding slot 61 in FIG. 1 which integrally formed as part of the vertical segment formed by inner vertical wall 53 and outer vertical wall 55). Rail 121 has anti-skid grooves 129, 131, 133, 135, 137 on the top of horizontal segment 123 and penetration means 151 located on the outside wall of vertical segment 125. Rail 121 also has hollow area 127 in its horizontal segment 123. Horizontal T-slot 143 on horizontal segment 123 has upwardly facing opening 145.

Figure 4:
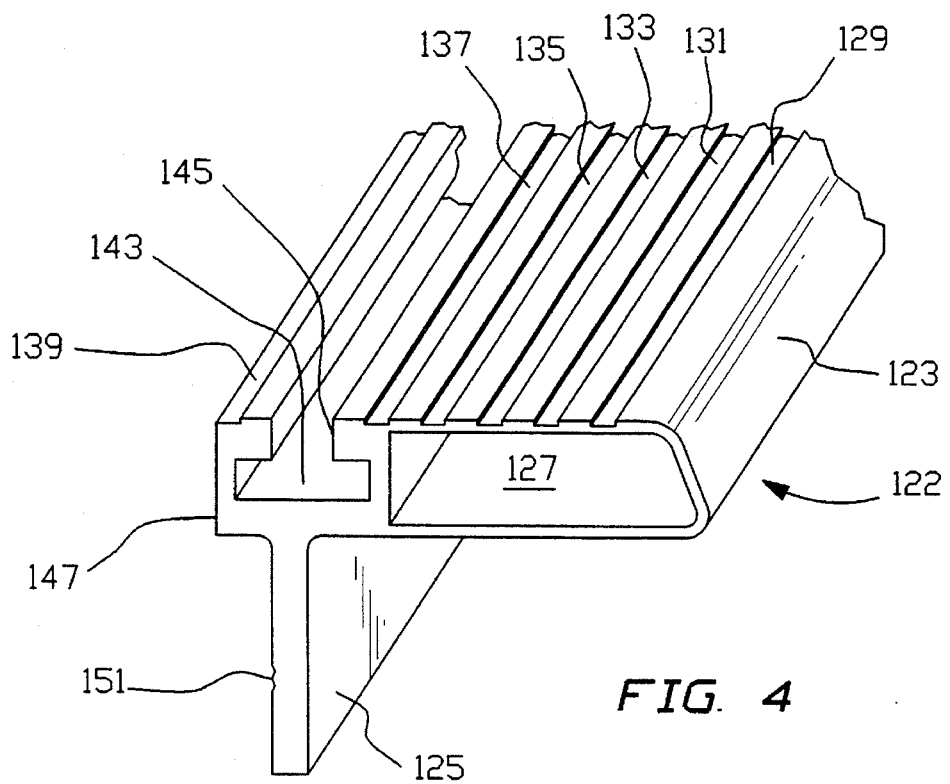
FIG. 4 shows a top perspective partial view of a fourth embodiment of the present invention utility rail with one horizontal T-slot and one hollow.

FIG. 4 shows a top perspective partial view of present invention utility rail 122 wherein like parts are like numbered to those in FIG. 3. Unlike the embodiment of FIG. 3 which has two T-slots, this embodiment has only one T-slot which is horizontal T-slot 143 with upwardly facing opening 145 located in horizontal segment 123 directly over vertical segment 125.

Utility rails 51 and 351 of FIGS. 1 and 2 are adapted for pick up truck cargo bed walls of wider thickness. Utility rails 121 and 122 shown in FIGS. 3 and 4 are adapted for pick-up truck bed walls of narrow thickness.

Figure 5:
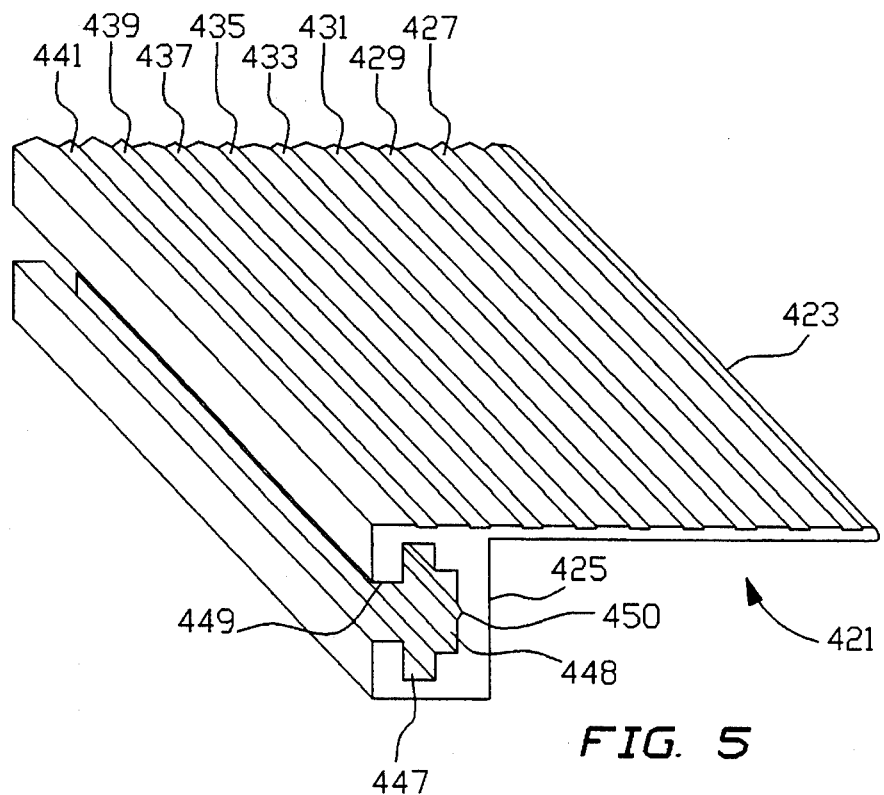
FIG. 5 shows a top perspective partial view of a fifth embodiment of the present invention utility rail with one vertical T-slot with recess.

FIG. 5 shows a top perspective partial view of present invention utility rail 421. Rail 421 has anti-skid grooves 427, 429, 431, 433, 435, 437, 439, and 441 on the top of its horizontal segment 423. Rail 421 also has vertical segment 425 and vertically arranged T-slot 447 with recess 448 and with opening 449 facing away from horizontal segment 423. T-slot 447 with recess 448 is integrally formed as part of vertical segment 425. Recess 448 is designed to accommodate the thickness of the head of a screw or bolt which may be used to secure rail 421 to the sidewall of a pick up truck bed. Penetration means 450, which in this case is a continuous locating groove, facilitates placement of a drill bit and penetration of the rail in an appropriate place for attachment of the rail to a structure such as the sidewall of a pick up truck cargo bed.

Figure 6:
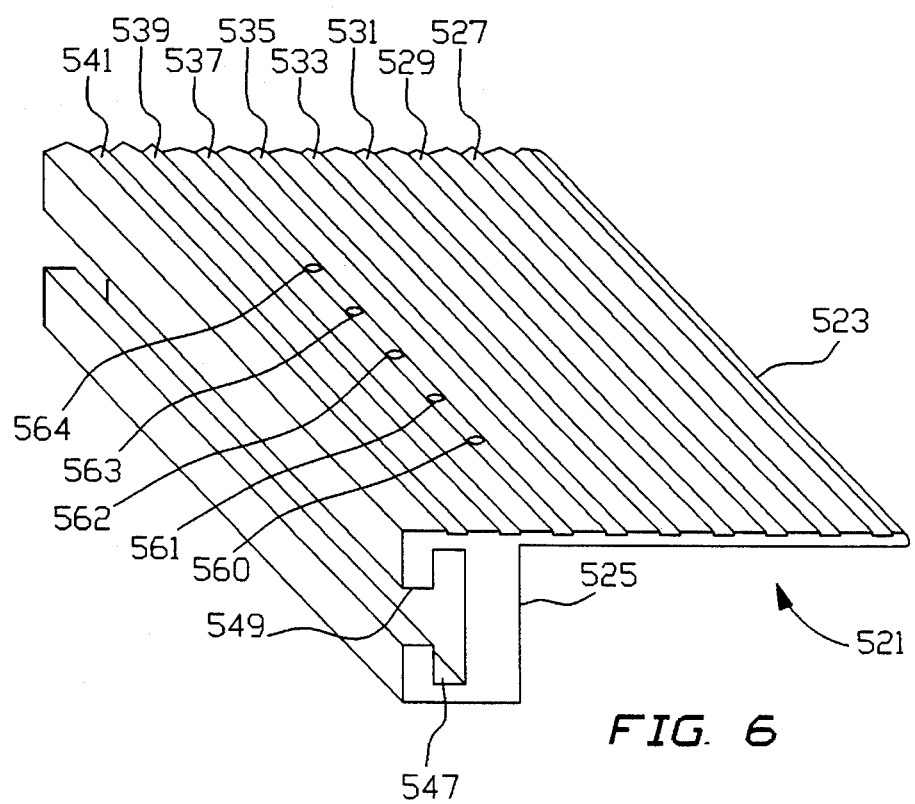
FIG. 6 a top perspective partial view of a sixth embodiment of the present invention utility rail with one vertical T slot and starter holes.

FIG. 6 shows a top perspective partial view of present invention utility rail 521 which may be used in the present invention. Rail 521 has anti-skid grooves 527, 529, 531, 533, 535, 537, 539, and 541 on the top of its horizontal segment 523. Rail 521 also has vertical segment 525 and vertically arranged T-slot 547 with opening 549 facing away from horizontal segment 523. T-slot 547 is integrally formed as part of vertical segment 525. Further, as an alternative to penetrating means in the form of grooves, here, after extrusion of the utility base rail 521, starter holes are drilled such as holes 560, 561, 562, 563 and 564. These starter holes may be drilled all the way through the material of the utility rail for placement of bolts or screws therethrough or they may be partially drilled, if desired, in order to facilitate placement of a drill bit and penetration of the rail for attachment of to the a structure, for example, the top of the sidewall of a pick up truck cargo bed.

Figure 7:
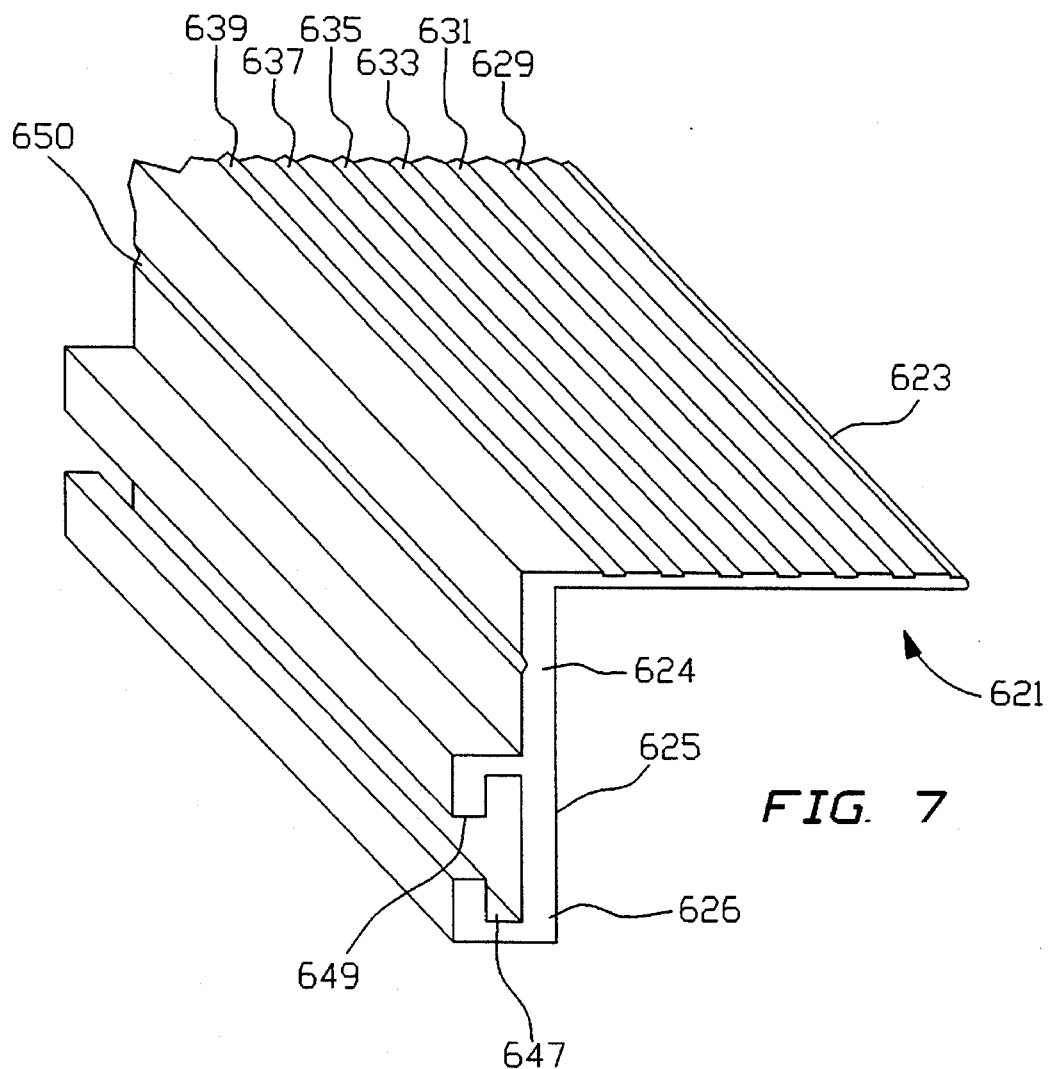
FIG. 7 shows a top perspective partial view of a seventh embodiment of the present invention utility rail with one vertical T-slot.

FIG. 7 shows a top perspective partial view of base rail 621 which may be used in the present invention racks. Rail 621 has anti-skid grooves 629, 631, 633, 635, 637, and 639 on the top of its horizontal segment 623. Rail 621 also has vertical segment 625 with upper portion 624 and lower portion 626 and vertically arranged T-slot 647 with opening 649 facing away from horizontal segment 623. T-slot 647 is integrally formed as part of vertical segment 625 at lower portion 626. Penetration means 650 which is a continuous locating groove is located along vertical segment 625 at its upper portion 624.

Figure 8:
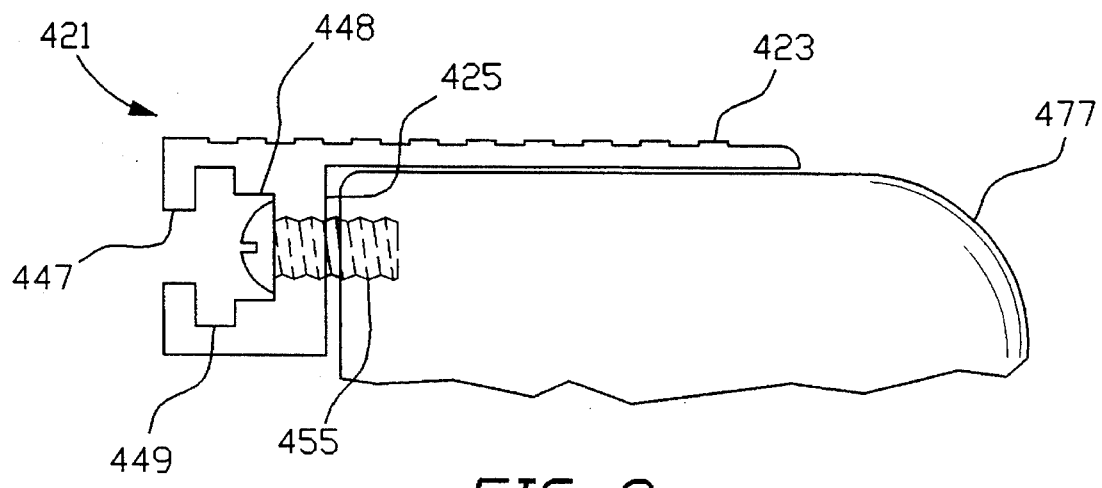
FIG. 8 shows a partial side cut view of the fifth embodiment of the present invention utility rail attached to the side wall of a pick up truck cargo bed.

FIG. 8 shows a partial side cut view of the rail 421 shown in FIG. 5 attached to the inside wall a cargo bed sidewall. Like parts to those in FIG. 5 are like numbered. As shown, utility base rail 421 is attached through the inside of side wall 477 of a pick-up truck cargo bed by means of screw 455 through vertical segment 425 with recess 448 in T-slot 449 accommodating the head of screw 455.

Figure 9:
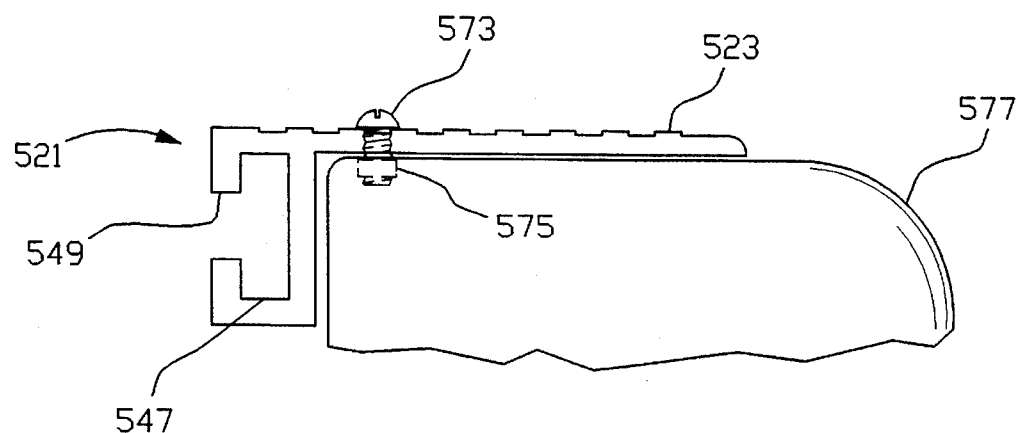
FIG. 9 shows a partial side cut view of the sixth embodiment of the present invention utility attached to the top of a side wall of a pick up truck cargo bed; and, FIG. 10 shows the present invention rails used in conjunction with a utility rack on a pick up truck cargo bed.

FIG. 9 shows a partial side cut view of the rail 521 shown in FIG. 6 attached to the top of a cargo bed sidewall. Like parts to those in FIG. 6 are like numbered. As shown, utility base rail 521 is bolted by means of bolt 573 and nut 575 through the top of horizontal segment 523 to the top of the side wall 577 of a pick-up truck cargo bed.

The present invention rails could be made of extruded plastic or metal or combinations of metal and non-metallic materials and could, alternatively, be molded instead of extruded. However, extrusion provides for the easier means of fabrication and allows for infinite possibilities for selected lengths. The hollowing areas which do not form a function of creating holding slots or penetrating means for fastening both conserve materials and create geometries which enhance the structural stability of the utility rails.

Figure 10:
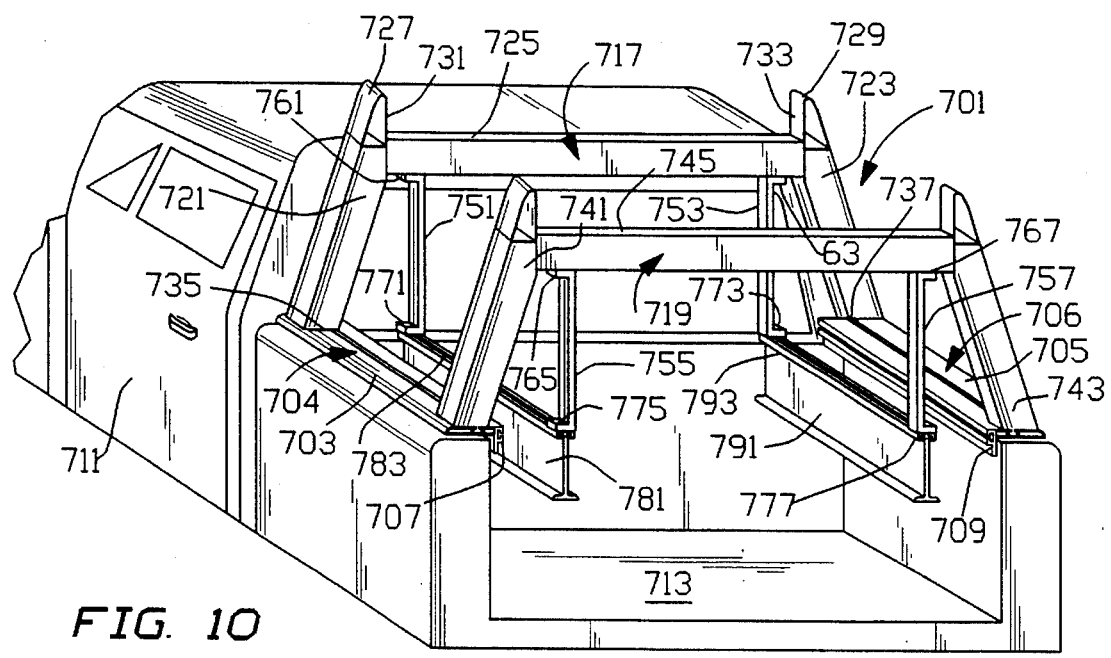

Referring now to FIG. 10 there is shown a top perspective view of a utility rack 701 mounted on cargo bed 713 of pick-up truck 711. A pair of present invention utility rails 704 and 706 have horizontal segments 703 and 705 and vertical segments 707 and 709, respectively. The horizontal segments 703 and 705 nest atop the sidewalls of cargo bed 713 and the vertical segments 707 and 709 seat against the sidewalls, as shown. They may be bolted down, welded or affixed by any known means.

Utility rack 701 includes stanchion units 717 and 719. Front stanchion unit 717 is attached to horizontal utility rail segments 703 and 705 at the lower portions 735 and 737 of vertical legs 721 and 723 by T-fasteners, i.e. bolts and T-slots, as shown here, or by other means, e.g. by welding, bolting, a combination of these, or other known means of attachment. The vertical legs 721 and 723 extend upwardly and inwardly and are mounted forwardly, as shown, and are connected by horizontal cross member 725. Lateral support blocks 727 and 729 are atop cross member 725 and, although optional, are preferred. These keep ladders, lumber, pipes, etc., from sliding or rolling off laterally at their inside surfaces 731 and 733. Also, due to the inward configuration of the vertical legs (e.g. 721 and 723) such items as ladders are transported away from the outer periphery of the pick-up truck. This becomes important when the truck is in motion and turning. The center of gravity is better maintained and there may be less tipping. This is safer and will cause less wear of shocks and springs. Also, note that the stanchions are not connected directly to one another but are connected by the horizontal cross members, as shown.

Rear stanchion unit 719 has vertical legs 741 and 743 and these are similarly attached to the base rails as are legs 721 and 723. Also, they generally have the same cross sections, angles, sizes, etc., as the forward stanchion unit, and, although an exact replication is not critical, it is preferred.

As can be seen in FIG. 10, suspension rods 751 and 753 hang downwardly from forward stanchion 717 and suspension rods 755 and 757 hang downwardly from rearward stanchion 719, as shown. They are connected at their tops 761, 763, 765 and 767, respectively. At the bottoms 771 and 775 of rods 751 and 755 is inner support beam 781, having a flat top 783. Likewise, at the bottoms of 773 and 777 of rods 753 and 757 is inner support beam 791, having a flat top 793. The beams 781 and 791 are connected by any known means and, in this case, by the use of T-fasteners (i.e. fasteners that are T-shaped or inverted T-shaped in profile) and T-slots. The beams 781 and 791 are referred to as "inner" support beams because they are located on the inside of the rails. They are "support" beams because they are utilized to support tool boxes, supplies, mounting plates, mounting connectors, power tools, hand tools, tanks and other equipment which may be used in various trades and/or which are normally transported by pick-up trucks, etc.

Obviously, numerous modifications and variations of the present invention are possible in light of the above teachings. It is therefore understood that within the scope of the appended claims, the invention may be practiced otherwise than as specifically described herein.

What is claimed is:

1. A utility rail, for attachment to pickup truck cargo bed structures, which comprises:

a unistructurally formed extruded elongated member with an elongated length having a generally L-shaped cross section comprised of two segments, one being a vertical first segment and the other being a horizontal second segment, said two segments being 90 degrees opposed, each of said two segments having an inside wall and an outside wall, said inside walls meeting each other at a 90 degree angle wherein said inside wall of said vertical first segment is adapted to nest against an inside surface of a cargo bed wall and said inside wall of said horizontal second segment has a predetermined width adapted to rest atop a cargo bed wall;

at least one elongated holding slot running along at least a portion of said elongated length of said elongated member, said elongated holding slot being a T-slot with an opening facing away from said 90 degree angle; and, penetration location means located on at least one of said outside walls for locating areas where said extruded elongated member may be penetrated with a plurality of attachment devices for attaching said rail to a structure, said penetration location means being a continuous groove running along at least a portion of said elongated length of said extruded elongated member.

2. The utility rail of claim 11 wherein said outside wall of said second horizontal segment includes a plurality of anti-skid grooves.

3. The utility rail of claim 1 wherein said T-slot is integrally formed with said vertical first segment and said T-slot opening faces away from said horizontal second segment.

4. The utility rail of claim 3 wherein said penetration location means is located on said outside wall of said vertical first segment.

5. The utility rail of claim 4 wherein said vertical first segment includes an upper portion and a lower portion and wherein said penetration means is located on said upper portion and said T-slot is located on said lower portion.

6. The utility rail of claim 3 wherein said T-slot further contains a recess opposite its opening to accommodate a head of an attachment device and wherein said penetration location means is located within said recess.

7. The utility rail of claim 1 wherein said T-slot further contains a recess opposite its opening to accommodate a head of an attachment device and wherein said penetration location means is located within said recess.

8. The utility rail of claim 1 wherein said second horizontal segment has at least one hollow formation running the entire length of said second horizontal segment.

9. The utility rail of claim 8, wherein said T-slot is integrally formed with said horizontal second segment.

10. The utility rail of claim 9 wherein said penetration location means is located on said outside wall of said first vertical segment.

11. The utility rail of claim 9 further including a second said T-slot integrally formed with said first vertical segment, said T-slot opening facing away from said second horizontal segment.

12. The utility rail of claim 8 wherein said outside wall of said horizontal second segment includes a plurality of anti-skid grooves.

* * * * *